United States Patent [19]

Itson

[11] Patent Number: 5,749,615
[45] Date of Patent: May 12, 1998

[54] CYCLING AND SKATING RAMP TRAILER

[75] Inventor: Joseph Derwood Itson, Huntington Beach, Calif.

[73] Assignee: GT Bicycles, Inc., Santa Ana, Calif.

[21] Appl. No.: 566,065

[22] Filed: Dec. 1, 1995

[51] Int. Cl.$^6$ .................................................. B62D 39/00
[52] U.S. Cl. .................................... 296/26; 296/181
[58] Field of Search ................................ 296/21, 26, 181

[56] References Cited

U.S. PATENT DOCUMENTS

| | | | |
|---|---|---|---|
| 4,129,916 | 12/1978 | Schlesinger | 14/69.5 |
| 4,285,514 | 8/1981 | Romero | 272/3 |
| 4,535,933 | 8/1985 | Kuiper | 296/26 |
| 4,958,874 | 9/1990 | Hegedus | 296/26 |
| 5,108,122 | 4/1992 | Beagley | 280/475 |
| 5,375,899 | 12/1994 | Wright | 296/26 |

FOREIGN PATENT DOCUMENTS 926445  5/1973  Canada ................................ 296/26

*Primary Examiner*—Gary C. Hoge
*Attorney, Agent, or Firm*—Stetina Brunda Garred & Brucker

[57] ABSTRACT

A cycling and skating ramp trailer comprises a first trailer portion attachable to a tow vehicle, and a second trailer portion releasably fixed to the first trailer portion. Upper ramps are formed on each of the trailer portions, and lower ramps are pivotally attached to each of the upper ramps. Upon reaching the exhibition site, the second trailer portion is released from the first trailer portion, and positioned such that the upper ramps are substantially opposed. Then, the lower ramps are deployed, and flat sections may be added therebetween, forming a half-pipe ramp. The ramp is easily transportable to the site, and rapidly erectable for use in cycling and skating exhibitions.

11 Claims, 3 Drawing Sheets

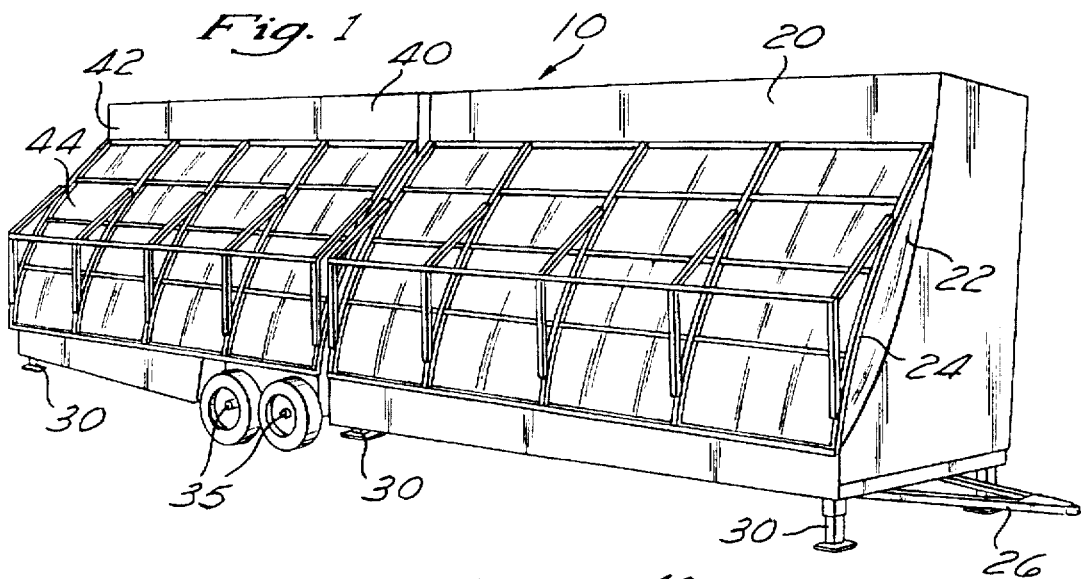
Fig. 1
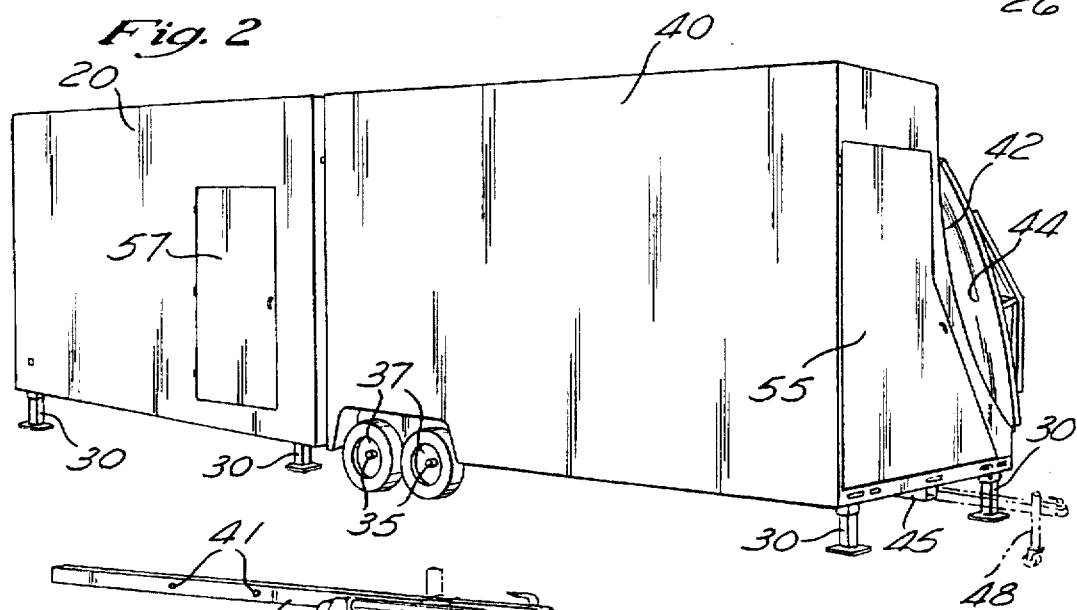
Fig. 2
Fig. 3
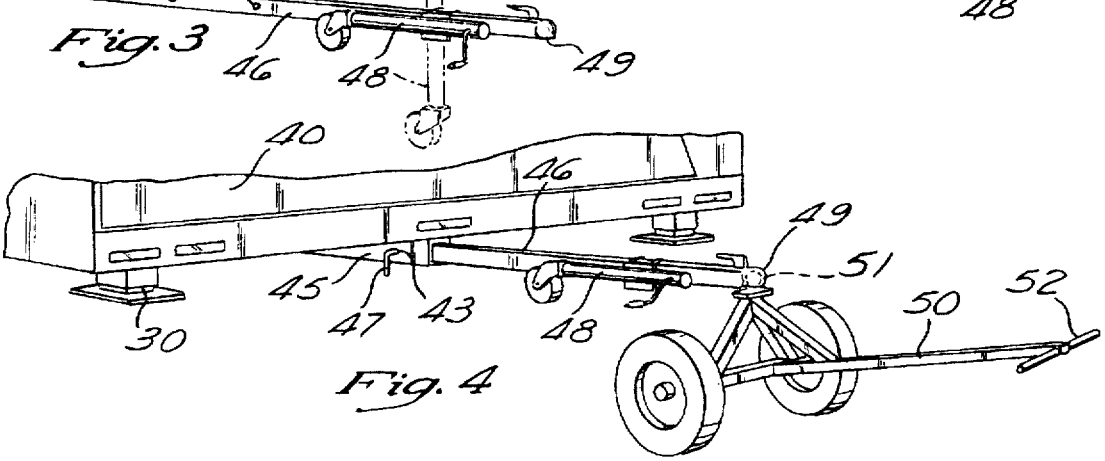
Fig. 4

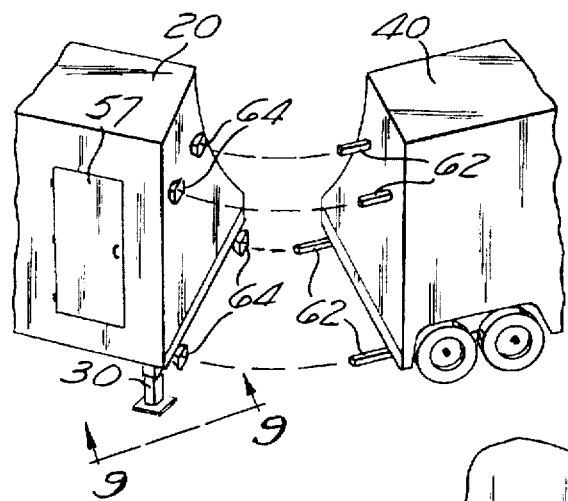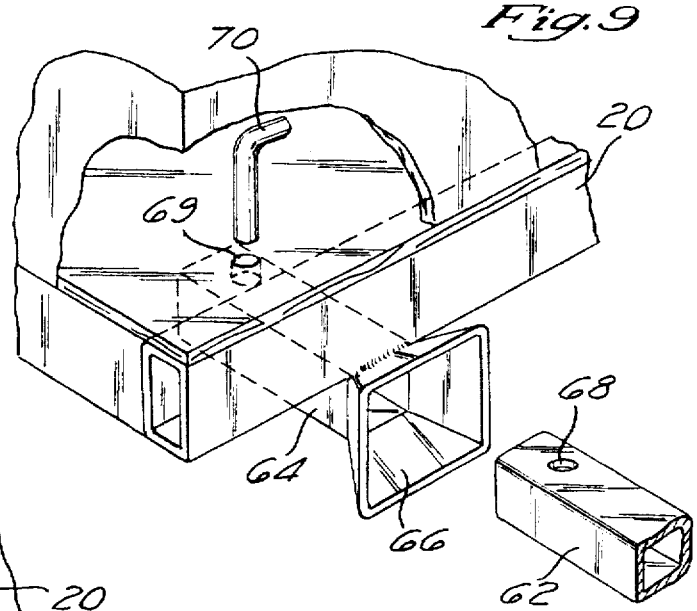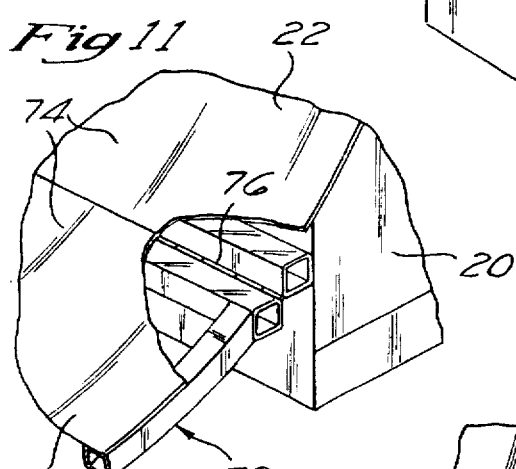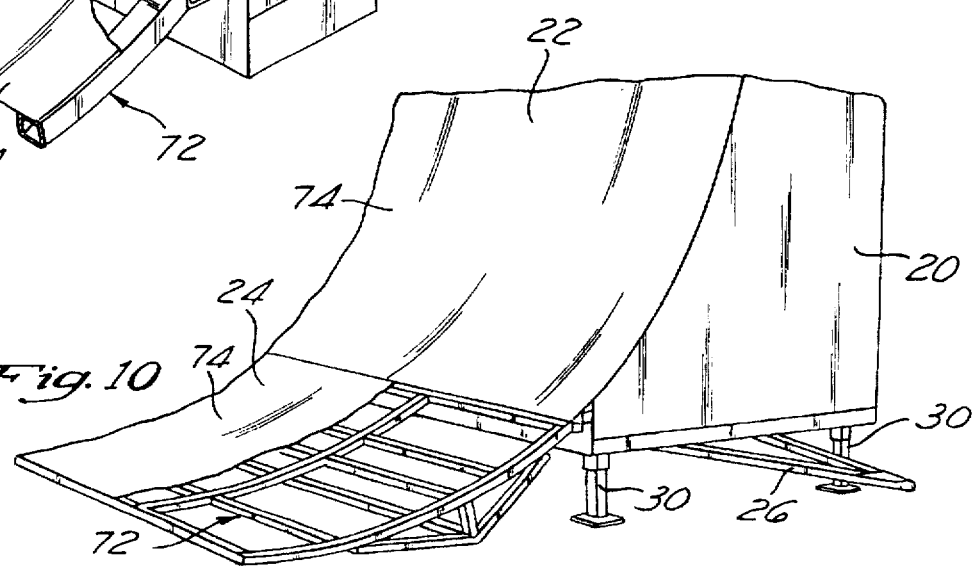

CYCLING AND SKATING RAMP TRAILER

FIELD OF THE INVENTION

The present invention relates generally to ramps for use in cycling and skating exhibitions, and more particularly to such ramps mounted to a trailer that are portable and rapidly erectable.

BACKGROUND OF THE INVENTION

Bicycling, skateboarding, and skating including rollerskating and in-line skating are popular recreational activities, especially among children and young adults. In connection therewith, a large market exists for businesses which sell bicycles, skateboards, skates, and related items such as helmets, pads, and clothing. To effectively market and promote their products, businesses in this industry often hold exhibitions or other shows where certain talented individuals perform daredevil stunts on large ramps.

The most popular ramp utilized in these shows is a "half-pipe" (180° curved sections), i.e., two "quarter-pipe" (90° curved sections) connected by a flat portion. The "half-pipe" ramp once erected allows cyclist and skaters to roll down the ramp at one end, and up the ramp at the other end, with numerous maneuvers inbetween, all at a high rate of speed. Bicycle and skating manufactures have found that such exhibitions effectively show off their products, leading to increased sales.

In the past to set up the large ramp structures for such an exhibitions, it was necessary to hire carpenters to undertake the labor-intensive task to erect such ramps on site and for tear down following the show. Though some bicycle and skate manufacturers who put on such shows produced modular ramp units which reduced the amount of assembly required on site, additional problems were presented in transporting the large modular ramp pieces to the site and in storing the large pieces when not in use.

Cycling and skating exhibitors have recently begun incorporating ramp portions into separate trailers, small enough not to be a "wide-load" on the highway. Towing of multiple trailers to the site, however, is cumbersome or difficult. Either multiple tow vehicles are required, or a special license or permit is needed due to the skill required to maneuver a train of separate trailers.

In view of the shortcomings of the prior art, it is desirable to provide a portable "half-pipe" ramp that may be easily transported by a single vehicle (no special license required) to the site and quickly erected, and disassembled and conveniently towed away to a storage location until called into service again. To Applicant's knowledge, the proposed solution has heretofore never been addressed.

SUMMARY OF THE INVENTION

The present invention specifically addresses and alleviates the above-mentioned deficiencies associated with the prior art. The present invention generally comprises a single trailer detachable from a tow vehicle and rapidly erectable into a half-pipe ramp for use in cycling and skating exhibitions. The trailer includes separable first and second portions, each having an upper ramp formed thereon, and each having a lower ramp attachable to the upper ramps, to form a pair of continuous ramps. The continuous ramps are positioned to substantially oppose each other, whereby a half-pipe ramp is formed.

In a preferred embodiment of the invention, the first trailer portion has a plurality of jack stands extendable to contact the ground, and the first trailer is attachable to the tow vehicle. The second trailer portion includes a plurality of rotating wheels which contact the ground, and the second trailer is releasably fixed to the first trailer. Preferably the second portion is also attachable to a tow vehicle, after being separated from the first portion. This trailer configuration may be pulled by a single tow vehicle, the driver required to have no special license or permit. Upon reaching the site, the second trailer is pulled away from the first trailer and relocated opposite the first trailer to form the half-pipe ramp.

In the preferred embodiment, the lower ramps are pivotally attached to the upper ramps, for ease in erecting the ramp and to maintain substantial alignment of the upper and lower ramps. Additionally, a flat ramp is added between the lower ramps, to extend the length of the continuous ramps. Also, horizontal platforms are present at the upper end of each upper ramp, such that cyclists and skaters can jump off and stop at the top of the ramp.

A method for rapidly erecting a half-pipe ramp of the present invention includes the steps of towing the single trailer to the site with a single vehicle, detaching the trailer portions having upper ramps formed thereon, and positioning the trailer portions such that the upper ramps are opposite each other. Then the lower ramps are positioned to the upper ramps to form continuous ramps, and preferably a flat ramp is placed between the continuous ramps. To tear down the half-pipe ramp the steps are merely reversed, and a tow vehicle removes the trailer from the site.

These as well as other advantages of the present invention will become more apparent from the following description and drawings. It is understood that changes in the specific structure shown and described may be made within the scope of the claims without departing from the spirit of the invention.

BRIEF DESCRIPTION OF THE DRAWINGS

FIG. 1 is a perspective view illustrating a trailer in accordance with the present invention;

FIG. 2 is a reverse perspective view illustrating the same trailer;

FIG. 3 is a perspective view of an attachment extension used in positioning the second trailer portion;

FIG. 4 is a perspective view of a portable dolly used in positioning the second trailer portion;

FIG. 8 is a perspective view of the interlocking joint between the first and second trailers;

FIG. 9 is an enlarged perspective view of a part of the interlocking joint between the trailers;

FIG. 10 is an enlarged perspective view of the support structure of the lower ramp; and FIG. 11 is a further enlarged view of the pivoting joint between the upper and lower ramps.

DETAILED DESCRIPTION OF THE PREFERRED EMBODIMENT

Figure 5:
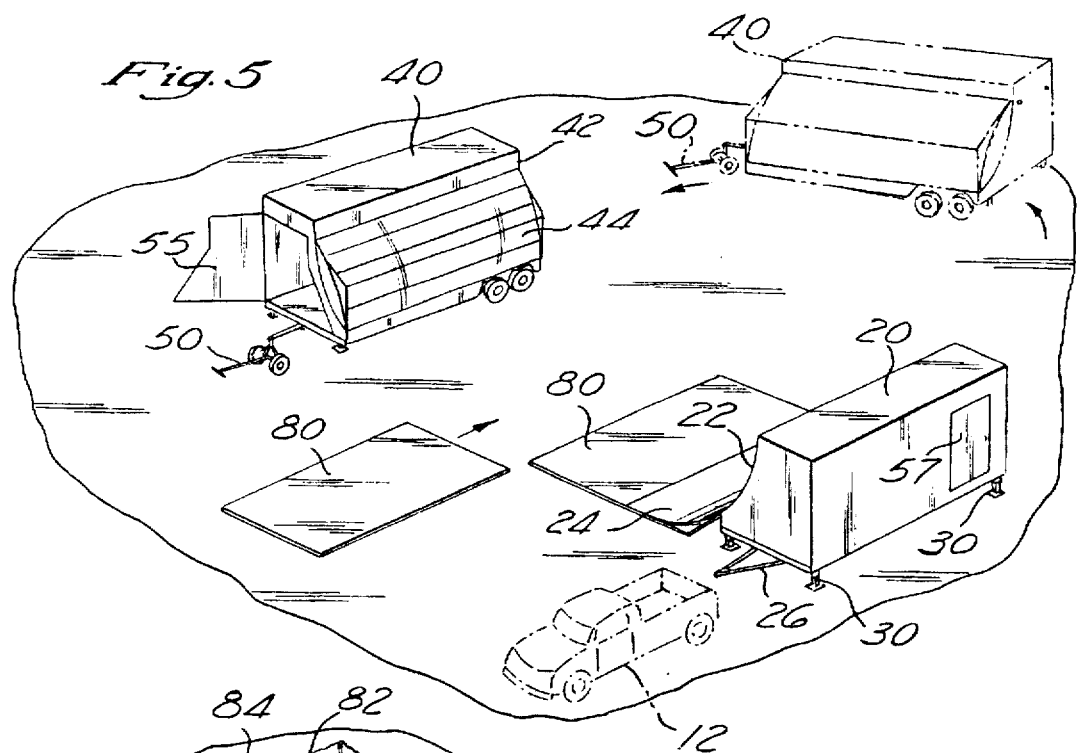
FIG. 5 is a perspective view illustrating the method of rapidly erecting a half-pipe ramp.

The detailed description set forth below in connection with the appended drawings is intended as a description of the presently preferred embodiment of the invention, and is not intended to represent the only form in which the present invention may be constructed or utilized. The description sets forth the functions and sequence of steps for constructing and operating the invention in connection with the illustrated embodiment. It is to be understood, however, that the same or equivalent functions and sequences may be accomplished by different embodiments that are also intended to be encompassed within the spirit and scope of the invention.

The cycling and skating ramp trailer 10 of the present invention is illustrated in FIGS. 1–11 which depict a presently preferred embodiment of the invention. Referring first to FIGS. 1 and 2, the trailer 10 is comprised generally of a first trailer portion 20 that is attachable to a tow vehicle 12 (see FIG. 5), and a second trailer portion 40 that is attachable to the first trailer portion 20. Formed upon the first portion 20 and second portion 40 are 10½-foot-high upper ramps 22 and 42, respectively, and deployable side, lower ramps 24 and 44, respectively. The 35-foot-long trailer 10 may be towed to an exhibition site, and rapidly erected into a 15-foot-wide×48-foot-long, half-pipe ramp for cycling and skating shows, as will be further described below.

The first trailer portion 20 includes a trailer hitch, namely a tongue structure 26, for attaching the trailer 10 to the tow vehicle 12. The first trailer portion 20 at the corners further includes four mega-floor jacks 30, extendable to contact the ground upon finally locating the first portion 20. The upper ramp 22 of the first trailer portion 20 is formed as an enclosed structure, having a smooth, contoured cycling or skating surface, preferably fabricated of thin aluminum sheet material. The enclosed structure further includes flat sidewalls and a floor and a top platform about 4 feet wide. The exterior surface of the sidewalls may advantageously include a display of trademarks or other advertising matter. The first portion 20 also includes an access door 55 and interior lights (not shown), to enable operation of the floor jacks 30 and other mechanisms associated with the preferred embodiment from inside the upper ramp 22.

The second trailer portion 40 includes an attachment means 45 for a towing extension 46, having a swivel drop wheel 48 and a cavity 49 sized to receive a conventional trailer hitch ball. The towing extension 46 is connectable to a dolly 50, that may be used to roll the second portion 40, upon separation, away from the first trailer portion 20. The dolly 50 has a platform with a trailer hitch ball 51 structurally connected to a manual tow bar 52. The second trailer portion 40 on the opposing end further includes tandem, heavy-duty 5000-pound axles 35, electric brakes (not shown), and a pair of chrome wheels 37. Finally, the second portion 40 upper ramp 42 is an enclosed structure which includes a storage door 55, that provides an entrance to store other structure associated with the preferred embodiment, and/or cycling and skating equipment.

Referring to FIGS. 8–9, the trailer 10 structure may be described in further detail. The first portion 20 is rigidly connected to the second portion 40 by an interlocking joint, consisting of four obtruding plug members 62 and four corresponding receptacle members 64. The obtruding plug members 62 and receptacle members 64 are formed of square steel tubing, the receptacle members 64 of a greater diameter for clearance to slidably receive the obtruding plug members 62. The obtruding plug members 62 and receptacle members 64 have matching holes 68 and 69, respectively, such that when properly aligned a locking pin 70 may be inserted to fix the relative position of the trailer 10 first 20 and second 40 portions to be separated a distance of approximately six inches. The receptacle members 64 also includes an enlarged mouth 66 or flared end, to facilitate the alignment and insertion of the obtruding plug members 62 into the receptacle members 64.

Now also referring to FIGS. 10 and 11, the structure of the deployable side, lower ramps 24 and 44, and their connection to the upper ramps 22 and 42, may be described. As shown for the first portion 20 of the trailer 10, the lower ramp 24 includes an underlying, welded arcuate frame assembly 72, and an overlying skin panel 74 fastened thereto, to provide that section of the contoured cycling or skating surface. The lower ramp 24 is preferably attached to the upper ramp 22 by a series of hinges 76, which pivotally connect the lower ramp 24 frame assembly 72 to the upper ramp 22 underlying structure. Obviously it is important that the lower ramp 24 as deployed is in close alignment with the upper ramp 22, to form a substantially continuous ramp. Towards that end, the overlying skin panel 74 of the lower ramp 24 upon being pivoted downward abuts and is substantially flush with the upper ramp 24 contoured surface, such that a smooth, contoured surface without an excessive gap or bump is formed for cycling and skating.

Figure 6:
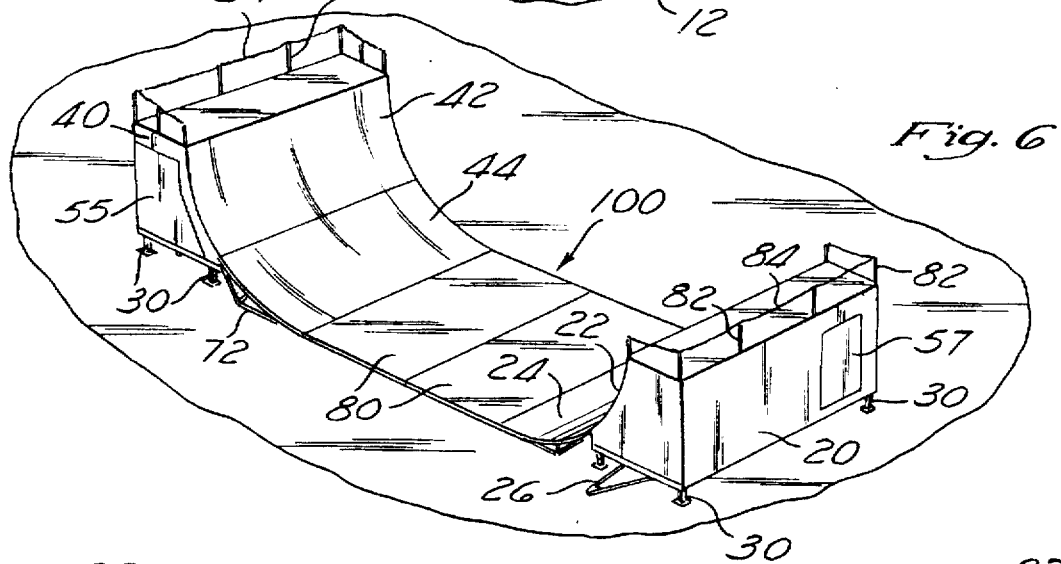
FIG. 6 is a perspective view of the assembled half-pipe ramp.
Figure 7:
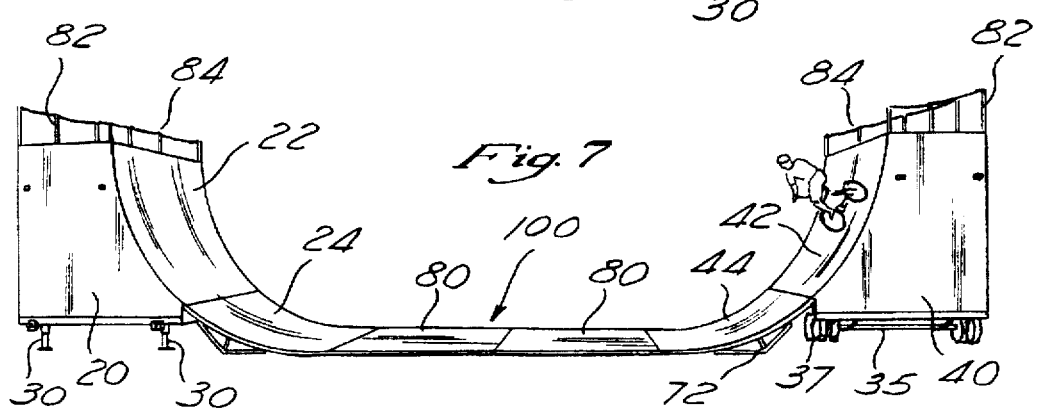
FIG. 7 is a perspective view of the half-pipe ramp in use.

Also referring to FIGS. 5–7, the preferred method for rapidly erecting a half-pipe ramp for cycling or skating exhibitions from a trailer 10 may be described. The cycling and skating ramp trailer 10 is towed to the exhibition site by the tow vehicle 12, the trailer 10 being attached to the tow vehicle 12 in a conventional manner through use of the trailer hitch tongue structure 26 and a conventional trailer hitch ball (not shown) attached to the lower rear portion of the tow vehicle 12. For towing to the site, the first trailer portion 20 and second trailer portion 40 are rigidly attached together, through use of the interlocking joint made up of the four obtruding plug members 62, receptacle members 64, and locking pins 70. It is important that the first trailer portion 20 is essentially fixed to the second trailer portion 40, such that the trailer 10 moves as a single unit. This avoids the difficulty of maneuvering a configuration of multiple trailers, especially around corners or backing up, which requires special driving skills to guide such a configuration. For towing the trailer 10 to the site, the extendable mega-floor jacks 30 are all in the retracted or up position, such that trailer 10 weight is supported by the pair of heavy-duty axles 35 and 37 and the trailer hitch tongue 26.

Upon reaching the exhibition site, the trailer 10 is positioned such that the first portion 20 is located where it is desired that one end of the ramp be erected. The four mega-floor jacks 30 at the corners of the first trailer portion 20 are extended to contact the ground to approximately level that first portion 20 of the trailer 10. Thereafter, the second trailer portion 40 is hooked up to a dolly 50 having a manual tow bar 52 for rolling the second trailer portion 40, such that the upper ramp 42 is opposite the upper ramp 22 and separated by a minimum distance of approximately 48 feet. The towing extension 46 is slidably inserted into the attachment means 45 of the second portion 40, until one of two holes 41 in the towing extension 46 is aligned with the matching hole 43 in the attachment means 45, such that a locking pin 47 may be inserted. Then the dolly 50 is attached to the towing extension 46 by merely positioning the platform ball 51 into the cavity 49. Next, the trailer portions 20 and 40 are separated from being fixed together by releasing the interlocking joint made up of four obtruding plug members 62 and receptacle members 64 (see FIG. 8). This is accomplished by removing the four locking pins 70 (FIG. 9), and using the dolly 50 to manually pull the trailer portions 20 and 40 apart. The second trailer portion 40 is pulled around to be opposite the first trailer portion 20 as shown in FIG. 5. Once the second portion 40 is positioned across from the first portion 20, the swivel wheel 48 may be engaged as shown in FIG. 2, and the dolly 50 may be removed.

Next the lower ramps 24 and 44 are deployed by pivoting them downward, from the stowed position to rest upon the ground. Because the lower ramps 24 and 44 are of considerable weight to provide necessary strength and rigidity, it may be desirable to place a mechanism or other means (not shown) between the lower ramps 24 and 44 and the first and second trailer portions 20 and 40, respectively, to slow the rate of descent of the deployable lower ramps 24 and 44. For example, a piston and gas cylinder cartridge or equivalent could be placed between the welded frame assembly 72 and other structure present on the first trailer portion 20.

Once the lower ramps 24 and 44 are deployed, further flat sections of ramp 80 may be positioned on the ground therebetween. The flat ramp sections 80 are approximately eight feet wide such that they may be stored inside the second trailer portion 40, and removed upon opening the storage door 55. At this point it may be necessary to slightly adjust the position of the second trailer portion 40 such that the ramp formed is straight and continuous, with minimal gaps between the various sections of ramp. Also at this point, the pair of mega-floor jacks 30 in the second trailer portion 40 should be extended to contact the ground, and the second trailer portion 40 brought to be approximately level. Once the second trailer portion 40 is finally positioned, the towing extension 46 can be removed and placed into storage. Additionally, a set of safety poles 82 and safety chains 84 should be installed around the perimeter of the top platform of the first 20 and second 40 trailer portions. Now the cycling and skating ramp 100 is ready for use as shown in FIG. 7, and the cyclist may proceed across the upper ramp 22 or 42 and jump off and stop on the top platform, without fear of falling off the top platform.

To tear down and remove the cycling and skating ramp 100 from the exhibition site, the steps of assembly and set up are merely reversed. The flat sections of ramp 80 are picked up and stored, and the lower ramps 24 and 44 are pivoted upward to the stowed position. The first and second portions 20 and 40 of the trailer 10 are brought together, such that the obtruding plug members 62 are engaged in the receptacle 64. A ratchet and chain mechanism (not shown) may be used at the interlocking joint to pull the two portions 20 and 40 of the trailer 10 together the final few inches, prior to inserting the four locking pins 70. The tow vehicle 12 is engaged to the trailer hitch tongue structure 26, and the mega-floor jacks 30 are retracted to the up position. The trailer may now be towed away from the site as a single unit.

It is understood that the exemplary cycling and skating ramp trailer described herein and shown in the drawings represents only a presently preferred embodiment of the invention. Indeed, various modifications and additions may be made to this embodiment without departing from the spirit and scope of the invention. These and other modifications and additions may be obvious to those skilled in the art and may be implemented to adapt the present invention for use in a variety of different applications.

What is claimed is:

1. A trailer detachable from a tow vehicle and rapidly erectable into a half pipe ramp for cycling and skating exhibitions, said trailer comprising:

a first trailer portion attachable to the tow vehicle;

a second trailer portion releasably fixed to said first trailer portion;

an upper ramp formed on each of said trailer portions; and a lower ramp attachable to each of the upper ramps to form continuous ramps;

said continuous ramps positionable to substantially oppose each other.

2. The trailer of claim 1 wherein:

the first trailer portion has a plurality of jack stands extendable to contact the ground; and the second trailer portion has an axle connected to a plurality of rotating wheels which contact the ground.

3. The trailer of claim 2 wherein:

the second trailer portion is also configured to be attachable to the tow vehicle.

4. The trailer of claim 1 wherein:

said lower ramps are pivotally attached to the upper ramps.

5. The trailer of claim 1 further comprising:

a flat ramp attachable to the lower ramps, to extend the length of said continuous ramps.

6. The trailer of claim 1 further comprising:

a substantially horizontal platform disposed proximate each upper end of said upper ramps.

7. The trailer of claim 1 wherein:

the upper ramps are formed as enclosed structures, said enclosed structures having a door to the inside.

8. A method for rapidly erecting a half-pipe ramp for cycling or skating at an exhibition site from a trailer, said method comprising the steps of:

detaching a first trailer portion from a tow vehicle, said first trailer portion having a first upper ramp formed thereon;

releasing a second trailer portion from the first trailer portion, said second trailer portion having a second upper ramp formed thereon;

positioning the second trailer portion such that said upper ramps are substantially opposed;

positioning a first lower ramp to said first upper ramp to form a first continuous ramp; and positioning a second lower ramp to said second upper ramp to form a second continuous ramp.

9. The method of claim 8, further comprising the step of:

positioning a flat ramp to the lower ramps between said continuous ramps.

10. The method of claim 8 wherein:

positioning the lower ramps to the upper ramps comprises the step of pivoting the lower ramps from a stowed position to a deployed position.

11. The method of claim 8 further comprising the step of:

fixing the first and second trailer portions together for transport to and from the site.

* * * * *